United States Patent [19]
McCraw

[11] Patent Number: 5,997,063
[45] Date of Patent: Dec. 7, 1999

[54] J-HOOK WITH SHANK PORTION HAVING OVAL-SHAPED TRANSVERSE CROSS-SECTION

[75] Inventor: Clarence L. McCraw, East Ridge, Tenn.

[73] Assignee: Columbus McKinnon, Amherst, N.Y.

[21] Appl. No.: 09/034,506

[22] Filed: Mar. 4, 1998

[51] Int. Cl.⁶ ...................................................... B66C 1/34
[52] U.S. Cl. ........................................................... 294/82.1
[58] Field of Search .............................. 294/82.1, 82.11, 294/85; 24/265 H, 598.1, 598.4, 698.1, 698.2; 59/93; 280/24, 480

[56] References Cited

U.S. PATENT DOCUMENTS

| | | | |
|---|---|---|---|
| 2,646,306 | 7/1953 | Foss | 294/82.1 |
| 3,488,025 | 1/1970 | Rowland | 294/82.1 X |
| 4,171,842 | 10/1979 | Tolle | 294/82.1 |
| 5,564,766 | 10/1996 | Lowery | 294/82.1 |

*Primary Examiner*—Johnny D. Cherry
*Attorney, Agent, or Firm*—Phillips, Lytle, Hitchcock, Blaine & Huber LLP

[57] ABSTRACT

An improved J-hook (20) includes an eye portion (21) having a circular transverse cross-section; an arcuate hook portion (22) having a circular transverse cross-section; a shank portion (23) arranged between the eye and hook portions and having an oval-shaped transverse cross-section; a first transitional portion (24) between the eye and shank portions and having a transverse cross-section in smooth continuous transition from the circular transverse cross-section of the eye portion to the oval-shaped transverse cross-section of the shank portion; and a second transitional portion (25) between the shank and hook portions and having a transverse cross-section in smooth continuous transition from the oval-shaped transverse cross-section of the shank portion to the circular transverse cross-section of the hook portion. The improved J-hook is drop-forged of "MT-10" steel, and exhibits a markedly-improved strength-to-weight ratio.

9 Claims, 1 Drawing Sheet

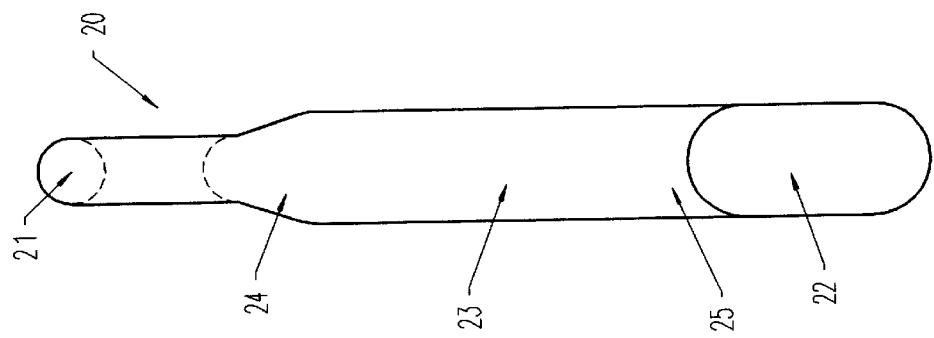
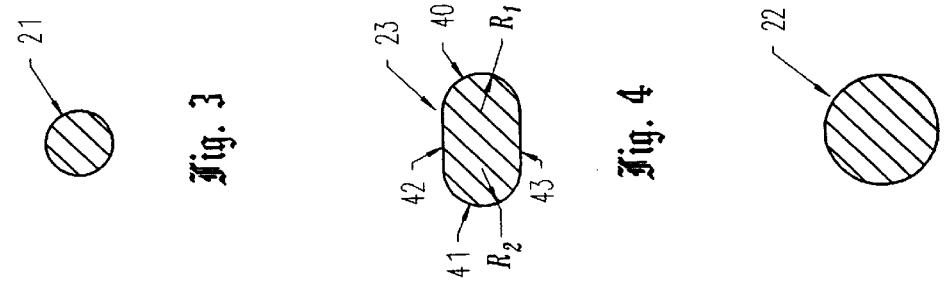
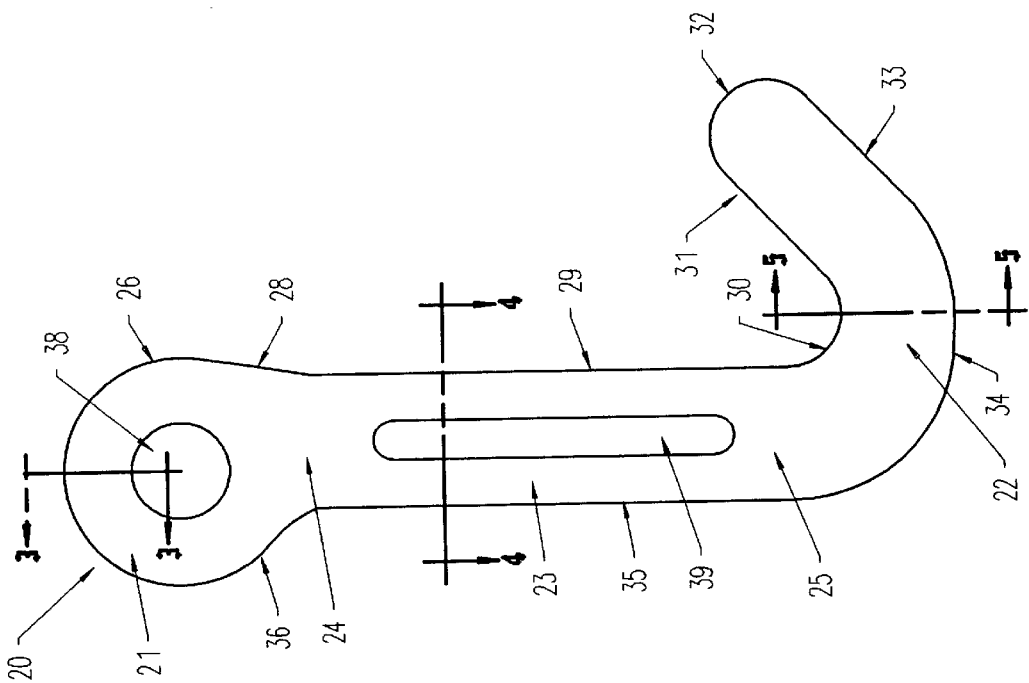

J-HOOK WITH SHANK PORTION HAVING OVAL-SHAPED TRANSVERSE CROSS-SECTION

TECHNICAL FIELD

The present invention relates generally to hooks for carrying a load, and, more particularly, to an improved drop-forged J-hook that has an unusual strength-to-weight ratio and that is particularly adapted for use in securing automobiles and trucks in both recovery operations and while being transported by truck or rail.

BACKGROUND ART

J-shaped hooks, commonly referred to as "J-hooks", are well known in various applications for connecting a load to a chain or the like. J-hooks are typically used for towing vehicles, such as by coupling an eye of the J-hook to a tow chain of a recovery vehicle and connecting an arcuate portion of the J-hook to a fixed member of the vehicle to be towed or to a chain attached to such a fixed member.

Many J-hooks, such as those described in U.S. Pat. Nos. 1,459,816 and 2,646,306, are designed exclusively for generally-constant vertical loading conditions associated with suspension of a load. J-hooks designed for vertical suspension loading are generally ill-suited for use in vehicle towing and securement due to their short "reach", this being defined as the distance from an inner radius of the arcuate portion of the J-hook to the center of attachment opening in an eye portion at the opposite end of the J-hook.

Common prior art J-hooks designed for the purpose of towing vehicles have been produced by bending a suitable length of steel rod of a given diameter into the desired J-shape, forming an eye portion with an attachment opening at the top end of the "J", and tapering the tip of the "J". J-hooks of this type have been manufactured using 7/8" diameter bar stock, and have a yield strength of approximate 7,000 pounds.

U.S. Pat. No. 4,171,842 appears to disclose a J-hook for towing vehicles which has a thickened elbow portion to enhance the strength characteristics of the J-hook. Tests conducted by applicant indicate that the J-hook according to this patent has a minimum breaking strength, defined as the loader force at which the J-hook fails or no longer supports the load under standard testing conditions of less than 10,000 pounds.

Still another J-hook for towing vehicles, which is owned by the assignee of the present invention, is shown and described in U.S. Pat No. 5,564,766. This patent discloses a J-hook formed by forging "Micro-Tuff 10" steel available from Chaparral Steel, located in Midlothian, Tex. The aggregate disclosures of the aforesaid U.S. Pat. Nos. 1,459,816, 2,646,306, 4,171,842 and 5,564,766 are hereby incorporated by reference insofar as the structure, material of construction, and uses of such J-hooks are concerned.

It would be generally desirable to provide an improved J-hook having an enhanced strength-to-weight ratio.

DISCLOSURE OF THE INVENTION

With paranthetical reference to the corresponding parts, portions or surfaces of the disclosed embodiment, merely for purposes of illustration and not by way of limitation, the present invention broadly provides and improved J-hook (20). The improved hook broadly includes: an eye portion (21) having a circular transverse cross-section; an arcuate hook portion (22) having a circular transverse cross-section; a shank portion (23) extending between the eye and hook portions, and having an oval-shaped transverse cross-section; a first transitional portion (24) between the eye and shank portions and having a transverse cross-section that varies in smooth continuous transition along its longitudinal extent from the circular transverse cross-section of the eye portion to the oval-shaped transverse cross-section of the shank portion; and second transitional portion (25) between the shank and hook portions and having a transverse cross-section that varies in smooth continuous transition along its longitudinal extent from the oval-shaped transverse cross-section of said shank portion to the circular transverse cross-section of the hook portion.

In the preferred embodiment, the improved J-hook is drop-forged of a particular steel, designated "Micro-Tuff 10" or "MT-10" and available from Chaparral Steel Co. Inc., 300 Ward Road, Midlothian, Tex. 76065-9651. This type of steel is a unique fine-grained alloy that consists essentially of: about 0.12% carbon, about 1.74% magnesium, about 0.11% phosphorous, about 0.027% sulfur, about 0.53% silicon, about 0.25% copper, about 0.09% nickel, about 0.11% chromium, about 0.020% molybdenum, about 0.013% tin, about 0.003% aluminum, about 0.100% niobium, and about 0.002% titanium, with the balance being iron.

In the preferred embodiment, the oval-shaped cross-section of the shank portion has a first arcuate surface (40) of a first radius ($R_1$), a second arcuate surface (41) of a second radius ($R_2$), and side surfaces (42, 43) tangentially joining the first and second surfaces. In one form, the first radius is about 0.3125 inches, the second radius is about 0.3125 inches, and the greatest distance between the first and second surfaces is about 0.750 inches. As used herein, the transverse cross-sectional shape of the shank portion is described as being "oval-shaped" because such shape resembles a track having two rounded end portions of equal diameter, with the marginal ends of such end portions being joined by straight portions. In this form, the eye portion has a nominal diameter of about 0.375 inches, and the hook portion has a nominal diameter of about 0.625 inches. Hence, the greatest minor dimension of the oval-shaped cross-section is twice radius $R_1$ or $R_2$, which is about equal to the diameter of the transverse cross-section of the hook-shaped portion.

This type of J-hook is often used with a 5/16" chain. The prior art "formed" type of hook is typically used with 5/16" Grade 43 High Test Chain, having a working load limit of 11,700 pounds. A unique feature of the improved drop-forged J-hook according to the present invention is that it will meet or exceed the load limit of 5/16" Grade 70 Transport Chain, namely, 18,800 pounds. To the best of applicant's knowledge, this is the only J-hook of this type and configuration that has this strength rating. A J-hook of the foregoing actual dimensions has been found to weigh about 9.65 ounces. Hence, this J-hook has a strength-to-weight ratio of about 2,410 lb/oz.

Accordingly, the general object of the invention is to provide an improved J-hook.

Another object is to provide an improved J-hook that may be used in vehicle recovery and transport operations.

Another object is to provide an improved J-hook that exhibits a markedly-improved strength-to-weight ratio.

These and other objects and advantages will become apparent from the foregoing and ongoing written specification, the drawings, and the appended claims.

BRIEF DESCRIPTION OF THE DRAWINGS

FIG. 1 is a side elevation of an improved drop-forged J-hook according to the present invention.

FIG. 2 is a right end elevation of the J-hook shown in FIG. 1.

FIG. 3 is a fragmentary vertical sectional view thereof, taken generally on line 3—3 of FIG. 1, and shows the eye portion as having a circular transverse cross-section.

FIG. 4 is a fragmentary horizontal sectional view thereof, taken generally on line 4—4 of FIG. 1, and shows the shank portion as having an oval-shaped transverse cross-section.

FIG. 5 is a fragmentary vertical sectional view thereof, taken generally on line 5—5 of FIG. 1, and shows the hook portion as having a circular transverse cross-section.

DESCRIPTION OF THE PREFERRED EMBODIMENTS

At the outset, it should be clearly understood that like reference numerals are intended to identify the same structural elements, portions, or surfaces, consistently throughout the several drawing figures, as such elements, portions or surfaces may be further described or explained by the entire written specification, of which this detailed description is an integral part. Unless otherwise indicated, the drawings are intended to be read (eg., cross-hatching, arrangement of parts, proportion, degree, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate.

Referring now to the drawings, and, more particularly, to FIGS. 1 and 2 thereof, the present invention broadly provides an improved J-hook, of which a presently preferred embodiment is generally indicated at 20. The improved J-hook is shown as broadly including an uppermost eye portion 21, a lowermost arcuate hook portion 22, an intermediate shank portion 23, a first transitional portion 24 between the eye and shank portions, and a second transitional portion 25 between the shank and hook portions.

As best shown in FIG. 1, the hook portion has an outer surface, when seen in outline, that sequentially includes an uppermost rounded or convex surface 26, a downwardly- and rightwardly-inclined surface 28, a rightwardly-facing vertical surface 29, an upwardly-facing arcuate and concave surface 30, an upwardly- and leftwardly-facing surface 31, a rounded tip 32, a downwardly- and rightwardly-facing surface 33, a lower-most downwardly-facing rounded surface 34, a leftwardly-facing vertical surface 35, and an arcuate surface 36 joining the upper margin of surface 35 with upper surface 26. The eye portion 21 has a hole 38. If desired, the J-hook may have an indented name plate portion, generally indicated at 39, extending slightly into the shank portion from either side thereof. This is provided so that the hook may be labeled with the size and gauge of the chain with which it may be used, or may contain other identifying information. This nameplate portion has been omitted from FIG. 4 for clarity of illustration.

As best shown in FIG. 3, eye portion 21 has a circular transverse cross-section. Similarly, as shown in FIG. 5, hook portion 22 has a circular transverse cross-section. However, as best shown in FIG. 4, the shank-portion has an oval-shaped transverse cross-section. This oval-shaped transverse cross-section includes an arcuate first surface 40 of radius $R_1$, a second arcuate surface 41 of radius $R_2$, and two side surfaces 42, 43, respectively tangentially joining the marginal ends of the first and second arcuate surfaces. Thus, the shank portion has an oval-shaped transverse cross-section, with surface 40 being positioned more closely to the hook portion surface 30 than surface 41. In one form, radius $R_1$ is about 0.3125 inches, radius $R_2$ is about 0.3125 inches, the greatest horizontal distance between surfaces 40, 41 (i.e., the major dimension) is about 0.750 inches, and the greatest vertical distance between surfaces 40, 40 (i.e., the minor dimension) is twice radius $R_1$, or about 0.625 inches, which is substantially the diameter of hook portion 22. The transitional portions 24, 25 extend for about 0.50 inches of the longitudinal extent of the hook.

As previously noted, the improved hook is drop-forged from "MT-10" steel from Chaparral Steel Co. Inc., 300 Ward Road, Midlothian, Tex. 76065-9651. This steel is an alloy which consists essentially of 0.12% carbon, about 1.74% magnesium, about 0.011% phosphorous, about 0.027% sulfur, about 0.53% silicon, about 0.25% copper, about 0.09% nickel, about 0.11% chromium, about 0.020% molybdenum, about 0.013% tin, about 0.003% aluminum, about 0.100% niobium, and about 0.002% titanium, with the balance being iron. This material has a forging quality (CE) of about 0.55. This micro-alloy steel is heated to a temperature of about 2200° F., is drop-forged, and is then quickly quenched in water while its temperature is greater than about 1350° F.

As previously noted, the improved drop-forged J-hook has been found to have superior strength-to-weight characteristics. In one form, the inventive J-hook had a strength-to-weight ratio of about 1,848 pounds per ounce (i.e., 18,800 lbs./9.65 oz.≈1,848 lb./oz.)

Modifications

The present invention contemplates that many changes and modifications may be made. For example, while it is presently preferred that the improved J-hook be drop-forged of "MT-10" steel or equivalent, this is not invariable. Other materials and manufacturing techniques would be appropriate. The shape and configuration of the improved J-hook may be changed or varied within the confines of the claims. For example, the J-hook could alternatively have a clevis-type connection (not shown), rather than a single eye. The salient feature which is believed to contribute to the improved strength-to-weight ratio is a combination of the use of the "MT-10" micro alloy steel, the drop-forging to form the J-hook, and the particular configuration of the shank portion with its oval-shaped transverse cross-section. Other parameters not specifically mentioned may also be varied.

Therefore, while a presently preferred form of the improved J-hook has been shown and described, and several modifications thereof discussed, persons skilled in this art will readily appreciate that various additional changes and modifications may be made without departing from the spirit of the invention, as defined and differentiated by the following claims.

What is claimed is:

1. A J-hook, comprising:

an eye portion having a circular transverse cross-section;

an arcuate hook portion having a circular transverse cross-section;

a shank portion between said eye and hook portions, and having an oval-shaped transverse cross-section;

a first transitional portion between said eye and shank portions and having a transverse cross-section in smooth continuous transition from the circular transverse cross-section of said eye portion to the oval-shaped transverse cross-section of said shank portion; and a second transitional portion between said shank and hook portions and having a transverse cross-section in smooth continuous transition from the oval-shaped transverse cross-section of said shank portion to the circular transverse cross-section of said hook portion;

and wherein the length of each transitional portion is less than the major transverse dimension of said shank portion.

2. A J-hook as set forth in claim 1 wherein said J-hook has been drop-forged.

3. A J-hook as set forth in claim 2 wherein said J-hook is formed of a steel alloy consisting essentially of: about 0.12% carbon, about 1.74% magnesium, about 0.011% phosphorous, about 0.027% sulfur, about 0.53% silicon, about 0.25% copper, about 0.09% nickel, about 0.11% chromium, about 0.020% molybdenum, about 0.013% tin, about 0.003% aluminum, about 0.100% niobium, and about 0.002% titanium, with the balance being iron.

4. A J-hook as set forth in claim 1 wherein said oval-shaped cross-section has a first arcuate surface of a first radius, a second arcuate surface of a second radius, and side surfaces tangentially joining said first and second arcuate surfaces.

5. A J-hook as set forth in claim 1 wherein said first radius is about 0.3125 inches, said second radius is about 0.3125 inches, and wherein the major transverse dimension of said shank portion between said first and second surfaces is about 0.750 inches.

6. A J-hook as set forth in claim 5 wherein the circular transverse cross-section of said eye portion has a diameter of about 0.375 inches.

7. A J-hook as set forth in claim 5 wherein the circular transverse cross-section of said hook portion has a diameter of about 0.625 inches.

8. A J-hook as set forth in claim 1 wherein the ratio of the yield strength of said J-hook to the weight of said J-hook is about 1,848 pounds per ounce.

9. A J-hook, comprising:

an eye portion having a circular transverse cross-section;

an arcuate hook portion having a circular transverse cross-section;

a shank portion between said eye and hook portions, and having an oval-shaped transverse cross-section;

a first transitional portion between said eye and shank portions and having a transverse cross-section in smooth continuous transition from the circular transverse cross-section of said eye portion to the oval-shaped transverse cross-section of said shank portion; and a second transitional portion between said shank and hook portions and having a transverse cross-section in smooth continuous transition from the oval-shaped transverse cross-section of said shank portion to the circular transverse cross-section of said hook portion;

and wherein the ratio of the yield strength of said J-hook to the weight of said J-hook is about 1,848 pounds per ounce.

* * * * *